(12) United States Patent
Takahashi et al.

(10) Patent No.: US 7,590,873 B2
(45) Date of Patent: Sep. 15, 2009

(54) POWER CONTROL METHOD AND SYSTEM WHEREIN A MANAGEMENT SERVER DOES NOT TRANSMIT A SECOND POWER CONTROL REQUEST TO AN IDENTIFIED BLADE SERVER WHEN A MANAGEMENT INFORMATION INDICATES THAT A FAILURE IS DETECTED IN THE IDENTIFIED BLADE SERVER

(75) Inventors: Shuta Takahashi, Fujisawa (JP); Ryuta Udo, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 470 days.

(21) Appl. No.: 11/431,892

(22) Filed: May 11, 2006

(65) Prior Publication Data

US 2007/0130481 A1 Jun. 7, 2007

(30) Foreign Application Priority Data

Dec. 1, 2005 (JP) ............................. 2005-347420

(51) Int. Cl.
*G06F 1/00* (2006.01)
*G06F 15/177* (2006.01)
*G06F 15/173* (2006.01)

(52) U.S. Cl. .................. 713/300; 709/220; 709/225

(58) Field of Classification Search .................. 713/300
See application file for complete search history.

(56) References Cited

U.S. PATENT DOCUMENTS 7,295,543 B2 11/2007 Kikuchi et al.

| | | | |
|---|---|---|---|
| 7,307,837 B2* | 12/2007 | Merkin et al. ................ | 361/685 |
| 2005/0015632 A1 | 1/2005 | Chheda et al. | |
| 2006/0136754 A1* | 6/2006 | Liu et al. ..................... | 713/300 |
| 2006/0218208 A1* | 9/2006 | Nagami et al. .............. | 707/203 |
| 2007/0220120 A1 | 9/2007 | Tsunehiro et al. | |

FOREIGN PATENT DOCUMENTS

| JP | 2000298534 | 10/2000 |
|---|---|---|
| JP | 200350649 | 2/2003 |
| JP | 2003-203189 | 7/2003 |
| JP | 200551473 | 2/2005 |
| JP | 2005038425 | 2/2005 |
| JP | 2005327233 | 11/2005 |

OTHER PUBLICATIONS

Takashi et al, Computer System, Nov. 24, 2005, JP2005-327233 Abstract.*
Takashi et al, Computer System, Nov. 24, 2005, JP2005-327233 Detail description.*
"Advanced Configuration and Power Interface Specification", Hewlett-Packard Corporation, Revision 3.0, Sep. 2, 2004, pp. 62-63.

\* cited by examiner

*Primary Examiner*—Suresh K Suryawanshi
(74) *Attorney, Agent, or Firm*—Brundidge & Stanger, P.C.

(57) ABSTRACT

A management server is installed for collectively accepting power control requests from clients. The management server authenticates a power control request received from a client with reference to a variety of tables which describe groups to which users and servers belong, respectively, and other attributes. Following successful authentication, the management server requests the blade server for remote power control.

15 Claims, 6 Drawing Sheets

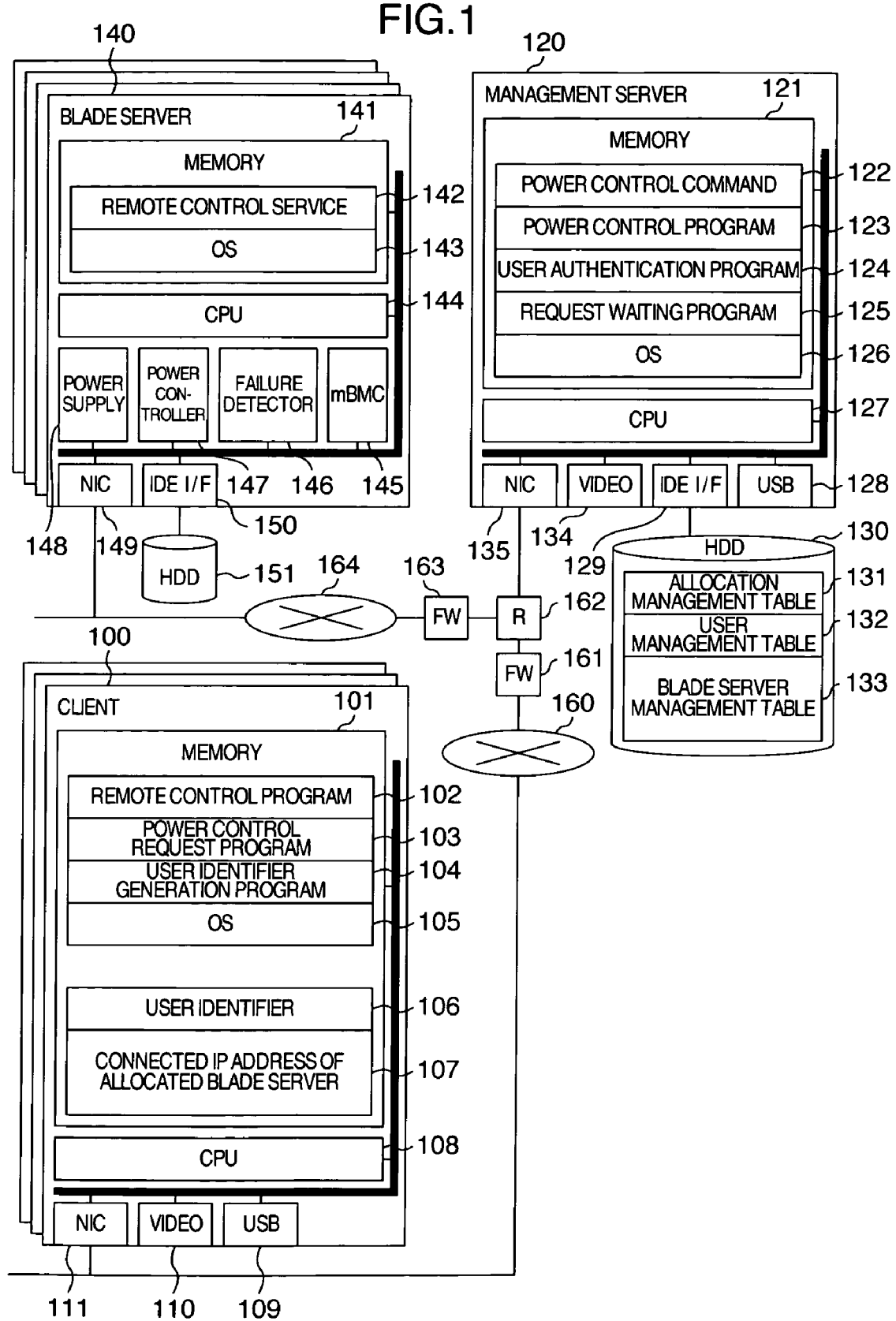

FIG.2

133 BLADE SERVER MANAGEMENT TABLE

| BLADE SERVER MANAGEMENT NUMBER | IP ADDRESS OF BLADE SERVER | GROUP TO WHICH BLADE SERVER BELONGS |
|---|---|---|
| 1 | 192.168.0.101 | GROUP 1 |
| 2 | 192.168.0.102 | GROUP 3 |
| 3 | 192.168.0.103 | GROUP 1 |
| 4 | 192.168.0.104 | GROUP 1 |
| 5 | 192.168.0.105 | GROUP 2 |
| 6 | 192.168.0.106 | GROUP 2 |
| 7 | 192.168.0.107 | GROUP 2 |

FIG.3

132 USER MANAGEMENT TABLE

| USER IDENTIFIER | GROUP TO WHICH USER BELONG | USER'S AUTHORITY |
|---|---|---|
| a | GROUP 1,2 | GENERAL USER |
| b | GROUP 2 | GENERAL USER |
| c | GROUP 2 | GENERAL USER |
| d | GROUP 1 | GENERAL USER |
| e | GROUP 3 | GENERAL USER |
| f | GROUP 1,2,3 | ADMINISTRATOR |

FIG.4

131 ALLOCATION MANAGEMENT TABLE

| BLADE SERVER MANAGEMENT NUMBER | ALLOCATABLE USER IDENTIFIER | ALLOCATION STATUS | POWER STATUS | FAILURE DETECTED / NOT DETECTED |
|---|---|---|---|---|
| 1 | a | ALLOCATED | ON | NOT DETECTED |
| 2 | d | NOT ALLOCATED | OFF | NOT DETECTED |
| 3 | a | ALLOCATED | OFF | NOT DETECTED |
| 4 | NULL | NOT ALLOCATED | UNKNOWN | DETECTED |
| 5 | a,b,c | NOT ALLOCATED | OFF | DETECTED |
| 6 | c | ALLOCATED | ON | NOT DETECTED |
| 7 | b | NOT ALLOCATED | OFF | NOT DETECTED |

FIG.5

500 GUI SCREEN OF POWER CONTROL REQUEST PROGRAM

| SELECTION | BLADE SERVER MANAGEMENT NUMBER | ALLOCATION STATUS | POWER STATUS | FAILURE DETECTED / NOT DETECTED |
|---|---|---|---|---|
| ○ | 1 | ALLOCATED | ON | NOT DETECTED |
| ○ | 3 | ALLOCATED | OFF | NOT DETECTED |
| ● | 5 | NOT ALLOCATED | OFF | DETECTED |

- 501 (table)
- 506 (selected radio)
- 507 (message area)
- 502 POWER ON (CONNECT)
- 503 SHUT DOWN (DISCONNECT)
- 504 FORCED POWER OFF
- 505 RESET

POWER CONTROL METHOD AND SYSTEM WHEREIN A MANAGEMENT SERVER DOES NOT TRANSMIT A SECOND POWER CONTROL REQUEST TO AN IDENTIFIED BLADE SERVER WHEN A MANAGEMENT INFORMATION INDICATES THAT A FAILURE IS DETECTED IN THE IDENTIFIED BLADE SERVER

INCORPORATION BY REFERENCE

This application relates to and claims priority from Japanese Patent Application No. 2005-347420 filed on Dec. 1, 2005, the entire disclosure of which is incorporated herein by reference.

BACKGROUND OF THE INVENTION

The present invention relates to a remote power control method and system for a computer system.

An existing power control technique authenticates a remote power control requester with a combination of a user ID with a password, immediately determines whether or not the requested power control should be conducted in response to the result of successful authentication, and conducts the remote power control. This technique may be applied to configure a system which comprises one or a plurality of servers that are waiting at all times. In response to a request for utilization from a client, part or all of resources provided by the waiting servers are allocated exclusively for the client. After the client has utilized the resources, the allocated servers are returned to the waiting state. Consequently, as shown in JP-A-2003-203189, a server rental system can be implemented, where a server is powered on when it is utilized by a client, and the server is powered off after the client has utilized the server.

Also, ACPI (Advanced Configuration and Power Interface) and IPMI (Intelligent Platform Management Interface) are existing technologies. X.509 recommended by ITU-T (International Telecommunication Union Telecommunication Standardization Sector) is a standard for electronic key certificates.

SUMMARY OF THE INVENTION

A blade server is a computer which is temporarily used in response to a request from a client computer. The blade server may be remotely controlled such that a client is allowed to utilize resources of the blade computer. This feature may be increased in scale such that a large number of clients can utilize a large number of blade servers, the power of which is controlled in accordance with the utilization. In such a system configuration, the following problems may be solved to facilitate the power control of a server computer located remotely from a client computer.

BMC (Baseboard Management Controller) for components defined by IPMI for used in remote power control is introduced in "-IPMI—Intelligent Platform Management Interface Specification Second Generation v2.0 Document Revision 1.0," p. 29, which is the specification of IPMI, and the like. A user authentication function of BMC simply stores a combination of a user ID with a password, which is compared for user authentication, and is therefore limited in hardware, has no margin in selecting the authentication scheme, and cannot ensure a higher level of security.

The foregoing limitations of the BMC impede the introduction of a server allocation management policy which groups users requesting power control and allocated servers, or provides a plurality of attributes to determine whether to permit the allocation and power control. Consequently, the BMC fails to mange systems with a high degree of freedom.

Devices are set and installed such that control signals (including unauthorized power control requests and power control requests) do not directly reach a BMC or similar hardware devices residing on a server for processing remote power control requests from the outside, and a management server is installed instead for collectively managing power control requests from clients. Only when the management server receives a power control request and successfully authenticates the power control request, the management server conducts the power control for the client. In this way, the server remote power control can be conducted exclusively by the reliable management controller to ensure the security.

In addition to the authentication of a power control request by the management server, a hardware device responsible for the power control may also authenticate a power control request made by the management server. The management server may simply receive a combination of a user ID with a password as a user identifier for use in the authentication performed by the management server. Alternatively, in order to ensure the identity of each user of a client who has made a power control request at a higher security level, a portable personal authentication device may be connected to the client for uniquely identifying the user. The personal authentication device may be forced to transmit a personal certificate for globally uniquely certifying the user, corresponding to the X.509 format of the ITU-T Recommendation mounted on the personal authentication device, together with the user identifier, for authentication of the personal certificate in addition to the authentication based on the user identifier, thus making it possible to prevent arrogation of the user using a stolen user ID and password.

In this way, the power control can be readily performed for a server computer which is located remotely from a client computer.

Other objects, features and advantages of the invention will become apparent from the following description of the embodiments of the invention taken in conjunction with the accompanying drawings.

BRIEF DESCRIPTION OF THE DRAWINGS

FIG. 1 is a block diagram illustrating an exemplary configuration of a system according to one embodiment of the present invention;

FIG. 2 shows an example of a blade server management table stored in a management server in the embodiment of FIG. 1;

FIG. 3 shows an example of a user management table stored in the management server in the embodiment of FIG. 1;

FIG. 4 shows an example of an allocation management table stored in the management server in the embodiment of FIG. 1;

FIG. 5 is a diagram illustrating an exemplary GUI screen of a power control request program according to one embodiment.

DETAILED DESCRIPTION OF THE EMBODIMENTS

Figure 6:
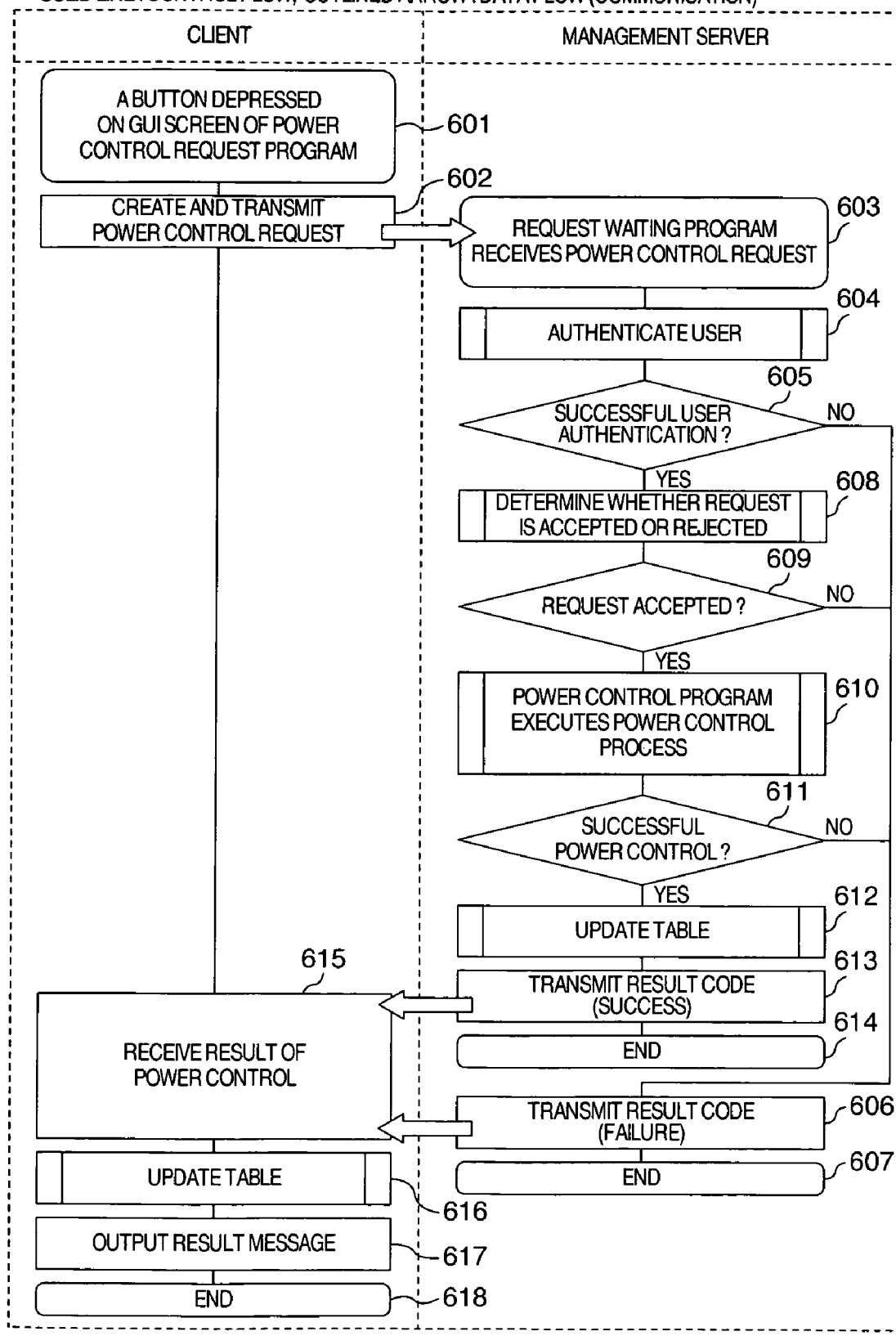
FIGS. 6 to 8 are flow charts illustrating exemplary flows of processes involved in power control according to one embodiment of the present invention.

In the following, embodiments of the present invention will be described in detail with reference to the accompanying drawings.

FIG. 1 is a block diagram generally illustrating the configuration of a system according to one embodiment of the present invention, where a management server, which is responsible for user authentication and remote power control in response to a request from a client, lends out blade servers.

A client 100 comprises a memory 101, a CPU 108, an USB (Universal Serial Bus) interface 109 which can be connected to a mouse, a keyboard, and a personal authentication device, a video interface 110 for outputting screen information to a display device connected thereto, and an NIC (Network Interface Card) 111. The memory 101 in turn stores a remote control program 102, a power control request program 103, a user identification generation program 104, and an operating system (OS) 105.

The remote control program 102 acquires a connected IP address 107 of an allocated blade server, connects to a remote control service 142 which is stored in a memory 141 of a blade server 140 and executed by a CPU 144 of the blade server 140, outputs a screen for controlling the blade server 140 onto a display device connected to the video interface 110 of the client 100, and transmits operation information on a mouse and a keyboard connected to the USB interface 109 to the remote control service 142, thereby allowing the user of the client 100 to control the blade server 140 through GUI (Graphical User Interface).

The power control program 103 receives a power control instruction for the blade server 140 from the user of the client 100, and requests a management server 120 to conduct the power control. The user identifier generation program 104 prompts the user to enter a user identifier 106 individually assigned to the user to acquire the user identifier 106, which permits unique identification of the individual user, for storage on the memory 101. The memory 101 also stores a connected IP address 107 of an allocated blade server, which is connected IP address information, arranged in a table form, of a remote control service on the blade servers, notified to the client 100 when the management server 120 allocates a blade server to the client 100. While the client 100 in FIG. 1 is a so-called THIN client which does not have a HDD (Hard Disk Drive), the client 100 may have a HDD.

The management server 120 comprises a memory 121, a CPU 127, a USB interface 128 which can be connected to a mouse and a keyboard, an IDE (Integrated Drive Electronics) interface 129 for connecting an HDD, an HDD 130 connected to the IDE interface 129, a video interface 134 for outputting screen information to a display device connected thereto, and an NIC 135. The memory 121 stores a power control command 122, a power control program 123, a user authentication program 124, a request waiting program 125, and an OS 126. The HDD 130 in turn stores a allocation management table 131, a user management table 132, and a blade server management table 133.

The blade server 140 comprises a memory 141, a CPU 144, an mBMC (mini-Baseboard Management Controller) 145 which omits part of functions of BMC, a failure detector 146, a power controller 147, a power supply 148, an NIC 149, an IDE interface 150 for connecting an HDD, and an HDD 151 connected to the IDE interface 150.

Here, the mBMC 145, which conforms to the IPMI specification, manages the power in response to a request from the outside. The failure detector 146 monitors signals from a temperature sensor and a voltage sensor installed within the blade server for failures, and has a function of returning a response indicative of the presence or absence of a failure in response to a query from the outside. The power controller 147 has a function of controlling the power supply 148, while the power supply 148 supplies power fed from the outside to the internal components of the blade server 140. It should be noted that the NIC 149, mBMC 145, and power controller 147 are powered from an auxiliary power supply, not shown, separate from the power supply 148, so that they function at all times even when the power supply 148 is turned off.

The memory 141 stores an OS 143 which is capable of controlling the power in conformity to ACPI, and a remote control service 142 which communicates with the remote control program 102 on the client 100 to transmit screen information to the remote control program 120 for controlling the blade server 140, and to receive operation information on the mouse and keyboard connected to the client 100 from the client 100 to operate the mouse and keyboard, thereby allowing the user of the client 100 to control the blade server 140.

The blade server 140 may be additionally provided with a video interface for outputting screen information to a display device connected thereto, and an interface for connecting a keyboard and a mouse. The blade server 140 may also store a power control command 122, a power control program 123, a user authentication program 124, a request waiting program 125, and an OS 126 on the memory 141. The blade server 140 may further store an allocation management table 131, a user management table 132, and a blade server management table 133 on the HDD 151. Thus, the blade server 140 may have a configuration equivalent to the management server 120, such that the blade server 140 may be utilized as a management server.

The NIC 111 of the client 100 is connected to an IP network 160, while the NIC 149 of the blade server 140 is connected to the IP network 164, and the IP network 160 and IP network 164 are interconnected through wirewalls 161, 163, and a router 162. The NIC 135 of the management server 120 is also connected to the router 162. The client 100, management server 120, and blade server 140 can bidirectionally communicate with one another. However, for purposes of preventing a malicious attacker from attacking the power control scheme by such means as the transmission of an unauthorized telegram and the like, the firewall 161 can be set to filter out and discard packets that have a feature of acting on the power control (for example, when a plurality of IP addresses are given to the NIC 149 of the blade server 140 to separate received packets into the OS side and power control side, packets destined to the IP address for power control) from among those packets transmitted from the IP network 160 toward the blade servers. Communications among the IP network 160, IP network 164, router 162, and NIC 135 may be in a wireless or a wired mode.

FIG. 2 shows in detail an example of the blade server management table 133 which resides on the HDD 130 of the management server 120. The blade management table 133 has columns of a blade server management number, a blade server IP address, and a blade server belonging group. The blade server management number column is registered with information which uniquely identifies a blade server; the blade server IP address column with a connected IP address, among IP addresses given to the NIC of the associated blade server, which is given when the remote control program 102 on the client 100 communicates with the remote control server 142; and the blade server belonging group column with a group identifier indicative of a group to which each blade server belongs. Here, each blade server necessarily belongs to one group.

The grouping can allow used computers to be managed in accordance with a plurality of attributes of users such as departments, sections and the like to which the users belong. When the blade servers differ in performance from one another, the blade servers may be classified, for example, in such a manner that high-performance blade servers belong to Group 1, and low-performance blade servers belong to Group 2. When the blade servers store different applications, the blade servers may be classified, for example, in such a manner that blade servers belonging to Group 1 are graphics dedicated machines which are installed with graphics applications, and blade servers belonging to Group 2 are business transaction machines which are installed with a word processor application, a spreadsheet application and the like.

By thus grouping used blade servers and managing the power for the blade servers in relation to groups, the user or administrator who is responsible for the power management will not erroneously operate the power of blade servers other than those in a group to which the user or administrator belongs.

FIG. 3 shows in detail an example of a user management table 132 which resides on the HDD 130 of the management server 120. The user management table 132 has columns of a user identifier, a user belonging group, and a user authority. The user identifier column is registered with user identifiers which can uniquely identify all uses who have the authority to utilize the blade servers from clients. The user belonging group column is registered with group identifiers for specifying groups of blade servers for which the power management is permitted to users corresponding to the user identifiers registered on the user identifier column on the same rows. The user authority column is registered with authorities of users corresponding to user identifiers registered on the user identifier column on the same rows in regard to the power control. There are two types of user authorities which are a general user and an administrator. A user having the authority of the general user can request for the power control only for a blade server for which his own user identifier is written as an allocatable user identifier in the allocation management table 131 among blade servers which belong to the same group as any of his own belonging groups. On the other hand, a user having the authority of the administrator can request for the power control for any of blade servers which belong to the same group as the group to which the user belongs.

FIG. 4 shows in detail an example of the allocation management table 131. The allocation management table has columns of a blade server management number, an allocatable user identifier, allocation status, power status, failure detected/not detected. The blade server management number column is registered with management numbers which uniquely identify blade servers, and the allocatable user identifier column is registered with user identifiers of users who can be allocated the blade server. A plurality of users may be allocated a blade server, in which case user identifiers of respective users are registered in the allocatable user identifier column. FIG. 4 shows that a blade server identified by management number 5 can be allocated to a plurality of users a, b, c.

However, the allocation of a blade server means that one blade server is exclusively occupied by a single user, so that while the blade server is allocated to one of allocatable users, other users will not be simultaneously allocated the same blade server. Conversely, a plurality of blade servers can be allocated to one user, and therefore the user utilizes these blade servers. FIG. 4 shows that blade servers identified by management numbers 1, 3 and 5 can be allocated to the user a.

When NULL is registered in the user identifier column instead of a user identifier, an associated blade server is not allocated to any user. The allocation status column stores information indicating whether an associated blade server has been allocated (unavailable) or has not been allocated (available) to a client by the management server. The power status column stores information indicative of the power status (on or off or unknown, i.e., information unavailable for any reason) of an associated blade server. The failure detected/not-detected column stores "detected" when the failure detector 146 of the blade server has detected a failure, and "not detected" when not detected. It should be noted that the information in the power status column and failure detected/not-detected column is updated on a periodic basis by the request waiting program 125 of the management server which queries the mBMC 145 and failure detector 146 of the respective blade servers, so that the administrator of the management server need not manually change this information in accordance with actual states.

The administrator of the management server can browse and edit the blade server management table 133, user management table 132, and allocation management table 131, so that when the administrator finds a blade server which is likely to fail because of "detected" stored in the failure detected/not detected column of the allocation management table 131, the administrator may temporarily rewrite the user identifier of an allocatable user to NULL, and returns the user identifier in the allocation management table 131 to the state before the rewrite after a problem of the blade server has been fixed, thereby making it possible to prevent a blade server suspected of a failure from being allocated to the user. Also, the administrator of the management server can dynamically manage the blade servers when the number of existing servers are expected to be exceeded by the number of users who want to use them, in which case the administrator may rewrite the allocation table 131 to change settings such that the servers are preferentially allocated to those users who belong to a particular group.

The user of the client 100 may execute the user identifier generation program 104 to store a user identifier 106 on the memory 101, and then execute the power control request program 103 to invoke a GUI screen as shown in FIG. 5. The GUI screen 500 comprises an information display/selection panel 501, a power-on button 502, a shut-down button 503, a forced power-off button 504, a reset button 505, and a message display area 507. The information display/selection panel 501 has areas for displaying a blade server management number, allocation status, power status, and information on the presence/absence of failure for each of blade servers which can be allocated to the user.

The displayed contents illustrated on the information display/selection panel 501, i.e., the blade server management number, allocation status, power status, and information on presence/absence of failure are outputted when a user having user identifier a invokes the GUI screen 500 when the blade server management table 133, user management table 132, and allocation management table 131 have the contents shown in FIGS. 2, 3, 4, respectively. It can be understood from the shown contents that the user having the user identifier a can exclusively utilize blade servers corresponding to management numbers 1, 3 which have been allocated to the user.

The power control request program 103 transmits the user identifier 106 to the management server 120 on a periodic basis to query the information to update the information displayed on the information display/selection panel 501.

The information display/selection panel also has a radio button 506 which is an interface for exclusively selecting one from a plurality of options for specifying a blade server as being subjected to the power operation when the user depresses the power-on button 502, or shut-down button 503, or forced power-off button 504, or reset button 550 to operate the power supply. The power-on button 502 is provided for instructing to power on an associated blade server; the shut-down button is provided for instructing to power off the blade server after the OS has been normally terminated on the blade server; forced power-off button 504 is provided for instructing to immediately power off the blade server without normally terminating the OS running on the blade server; and the reset button 505 is provided for instructing to initialize the hardware without normally terminating the OS running on the blade server.

FIG. 6 illustrates a process executed by the client 100 and management server 120 when the user requests for the power control on the client 100. First, as the user depresses the power-on button 502 or shut-down button 503 or forced power-off button 504 or reset button 505 on the GUI screen 500 of the power control request program 103 which resides on the client 100, the power control request program 103 creates a telegram for the power control request which includes information on the type of power control in accordance with the depressed button, a blade server management number which uniquely identifies a blade server subjected to the power control, selected by the radio button 506, and the user identifier 106 which uniquely identifies the user himself who has requested for the power control, and transmits the telegram to the management server (602). The request waiting program 125 on the management server, upon receipt of the telegram for the power control request (603), extracts the user identifier 106 embedded in the telegraph, and passes the extracted user identifier 106 to the user authentication (604). The user authentication (604) compares the passed user identifier 106 with user identifiers on the user identifier column of the user management table 132, and determines successful user authentication if the passed user identifier is detected on the user identifier column, or failure in user authentication if not detected (605).

While the client user identifier which is the identifier for the user to access the client may be the same as the user identifier which is the identifier for the user to access a blade server, different identifiers may be provided such that the administrator can control a blade server corresponding to another user identifier used by another user using a client identifier used by the administrator.

The user authentication (604) can be expanded in order to ensure a higher security level. For example, a personal authentication device having a personal certificate such as an electronic certificate installed therein is distributed to each user. The user connects this personal authentication device to the USB interface 109, such that the user identifier generation program 103 on the client 100 retrieves the personal certificate stored in the personal authentication device for use as a user identifier. Then, the request waiting program of the management server which has received a power control request queries a certifying authority for the received personal certificate to confirm whether or not the user is not arrogated, thereby making it possible to ensure a higher security level.

In addition, identification information such as a MAC (Media Access Control) address, an IP (Internet Protocol) address and the like of the client used by the user may be used for the user authentication for controlling the power, or each client may be given a unique machine ID such that the machine ID is used in addition to the user identifier for the authentication of the user who requests for the power control. In this way, the power control cannot be conducted unless a power control request is issued from a client used by that user, thus making it possible to ensure a higher security level for dealing with the spoofing of the user.

The request waiting program 125 on the management server, when failing to authenticate the user, transmits a result code (failure) to the power control request to the client (606), followed by termination of the request waiting program 125 (607). On the other hand, the request waiting program 125, when successfully authenticating the user, extracts, from the telegraph for the power control request, information on the type of power control in accordance with a depressed button, and the blade server management number which can uniquely identify a blade server that is subjected to the power control to determine whether or not the requested power control can be conducted for the target blade server, and confirms the allocation management table 131, user management table 132, and blade server management table 133 owned by the management server to determine whether the power control request should be accepted or rejected (608).

In the determination (608) as to whether or not the power control request should be accepted or rejected, the request waiting program 125 on the management server rejects the power control request unless a belonging group of the blade server subjected to the power control described in the blade server management table 133 is not included in the belonging group of the user who has made the power control request described in the user management table 132. On the other hand, if the belonging group of the blade server subjected to the power control described in the blade server management table 133 is not included in the belonging group of the user who has made the power control request described in the user management table 132, the request waiting program 125 retrieves the authority of the user who has made the power control request from the user management table 132 using the user identifier as a search key. When the user is an administrator, the power control request is preliminarily accepted. When the user is a general user, a user identifier allocatable to the blade server subjected to the power control is retrieved from the allocation management table 131. When the retrieved user identifier matches the user identifier of the user who has made the power control request, the power control request is provisionally accepted, and otherwise the power control request is rejected.

Further, the request waiting program 125 determines whether or not the provisionally accepted power control request should be accepted from the authority of the user who has made the power control request, and the state of the blade server in the allocation management table 131. First, when the user who has made the power control request has the authority of an administrator, the power control request is accepted irrespective of whether the power control request involves any of power-on, shut-down, forced power-off, and reset. On the other hand, when the user who has made the power control request is a general user, a request for power-on is accepted only when the allocation status is "not allocated," the power state is "off," and the failure detected/not detected is "not detected." A request for shut-down, forced power-off, or reset is accepted only when the allocation status is "allocated," the power state is "on," and the failure detected/not detected is "not detected." Otherwise, the request is rejected.

Upon determining that the request should be rejected, the request waiting program 125 on the management server does not conduct the power control, but transmits a result code (failure) to the client, followed by termination of the request waiting program 125. On the other hand, upon determining that the request should be accepted, the request waiting program 125 causes the power control program 123 to execute a requested power control process (610). Then, the request waiting program 125 acquires the result of the power control conducted by the power control program 123 to determine whether the power control was successful or unsuccessful (611). When unsuccessful, the request waiting program 125 transmits a result code (failure) to the power control request to the client (606), followed by termination of the request waiting program 125 (607).

On the other hand, when the power control program 123 has successfully conducted the power control, the tables are updated (612). In the table update (612), when power-on has been succeeded, the allocation status is updated to "allocated" in the allocation management table 131. When shut-down or forced power-off has been succeeded, the allocation status is changed to "not allocated" in the allocation management table 131. Then, the request waiting program 125 transmits a result code (success) as well as the management number and IP address of the allocated blade server from the blade server management table 133, when newly allocated by power-on, to the client, followed by termination of the request waiting program 125 (614). The power control request program 103 on the client 100 creates a power control request to the management server (602), and subsequently receives the result of the power control from the management server (615). When there is a newly allocated blade server in the table update (616), its IP address is added to the connected IP address 107 of the blade server, and a message corresponding to the result of the power control is outputted to the message display area 507 on the GUI screen 500 (617), followed by termination of power control request program 103 (618).

Figure 7:
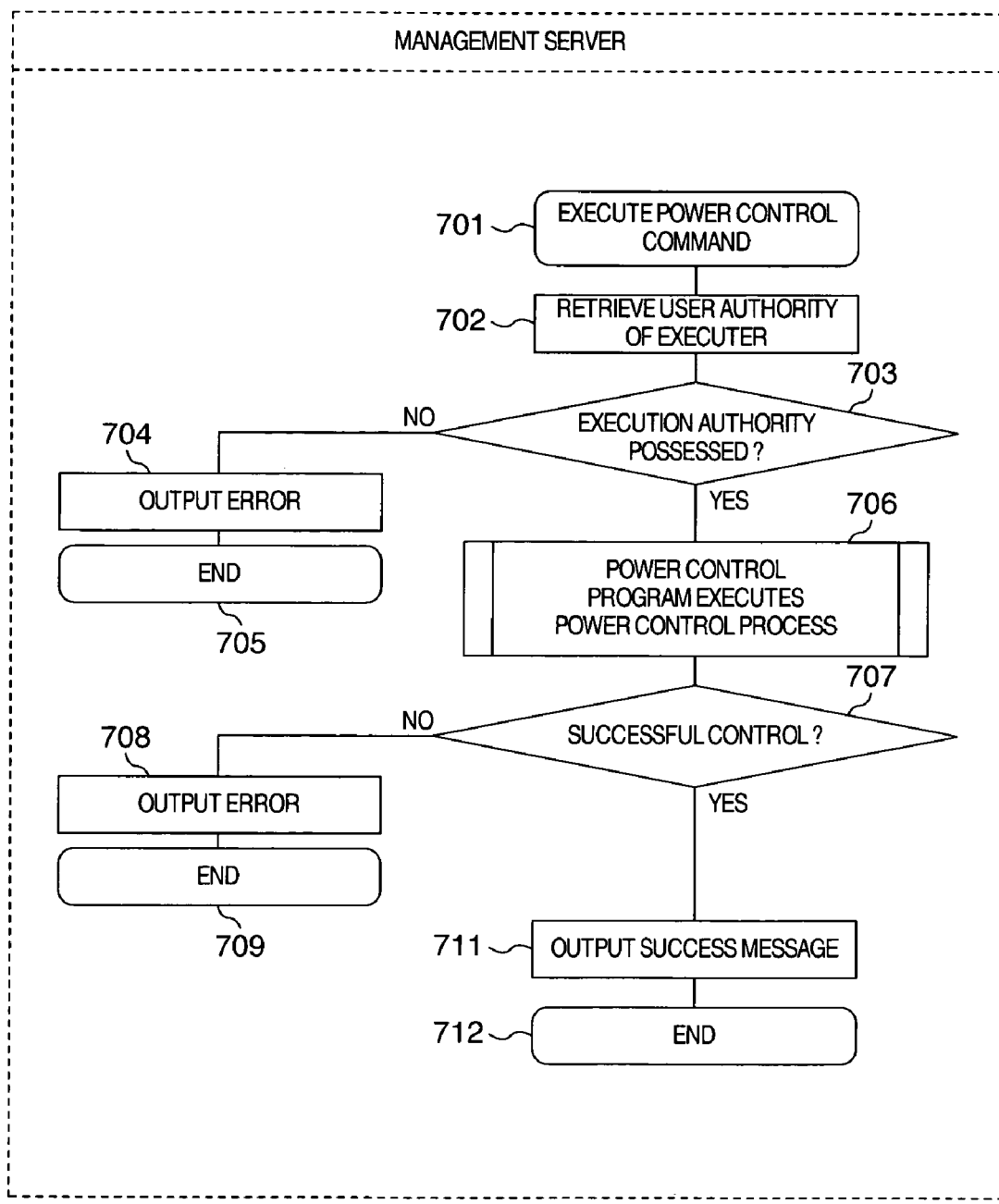

FIG. 7 illustrates a power control processing flow when the power control command 122 is executed (701) on a CUI (Character User Interface) provided by the OS 126 in order for the administrator of the management server 120 to manually control the power of the blade server 140. First, as the power control command 122 is executed on the management server 120 (701), the power control command retrieves information on the execution authority of the executer from the OS 126 to determine whether or not the executer has the authority of the administrator of the OS 126 (703). Here, if the executer does not have the authority of the administrator of the OS 126, the power control command 122 outputs an error on the CUI provided by the OS 126, on the assumption that the executer does not have the authority to execute the power control command, followed by termination of the power control command 122 (705). On the other hand, when the executer has the authority of the administrator of the OS 126, as determined at 703, the power control command 122 causes the power control program 123 to execute a power control process (706) on the assumption that the user has the authority to execute the power control command. If the result is a failure, the power control command 122 outputs an error on the CUI provided by the OS 126, followed by termination of the power control command 122 (709). On the other hand, if the result is a success, the power control command 122 outputs a success message on the CUI provided by the OS 126 (711), followed by termination of the power control command 122 (712).

Figure 8:
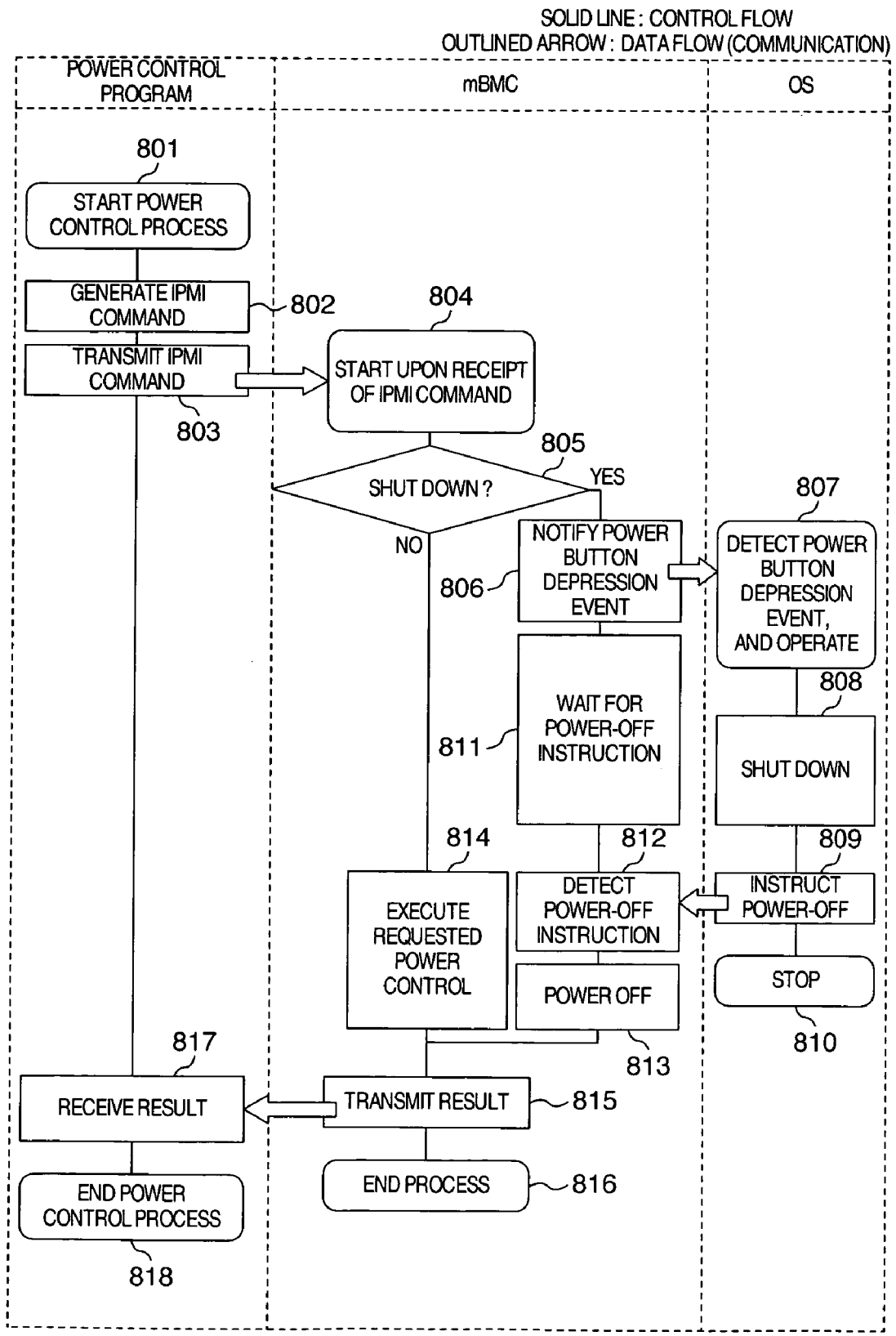

FIG. 8 is a flow chart illustrating a processing flow when the power control program 123 on the management server 120 conducts remote power control for the mBMC 145 and OS 143 on the blade server 140. First, the power control program 123 generates an IPMI command (802) for converting a power control instruction from the request waiting program 125 or power control command 122 into an IPMI command. The IPMI command generated herein is a chassis control command described in the IPMI specification, "-IPMI-Intelligent Platform Management Interface Specification Second Generation v2.0 Document Revision 1.0," p. 358 and the like. The chassis control command, for making a request, specifies "Power Up" for instructing power-on in response to a power-on request; "Power Down" for instructing power-off in response to a forced power-off request; "Hard Reset" for instructing a reset in response to a reset request; and "Soft Shutdown" for instructing shut-down in response to a shut-down request. The power control program 123 executes an IPMI command transmission (803) for transmitting the generated IPMI command to the mBMC 145 on the blade server. The mBMC 145 on the blade server 140, upon receipt of the IPMI command, starts the power control process (804). The mBMC 145 on the blade server 140 confirms whether or not the contents of the received IPMI command are "Soft Shutdown" which requires the execution of power-off after an OS termination process is executed (805).

Here, when the IPMI command involves the "Soft Shutdown" request, the mBMC 145 notifies the OS 143 of a power button depression event using ACPI in order to instruct the OS 143 to start a shut-down. This power button depression event, as introduced in "Advanced Configuration and Power Interface Specification Revision 3.0," which is the specification of ACPI, p. 63, is generally notified when the user keeps depressing the power button for four seconds or longer. However, the power button depression button event is herein notified in order for the mBMC 145 to cause the OS 143 to execute "Soft Shutdown." Upon detection of this event, the OS 143 executes a shut-down process (808), previously selected by the administrator in settings of the power control of the OS 143, in response to the power button depression event, instructs the mBMC 145 to power off (809) at the time the safety is ensured even if the blade server is powered off, and stops (810).

On the other hand, upon receipt of a "Soft Shutdown" request (806), the mBMC 145 notifies the OS 143 of the power button depression event, and waits for a power-off instruction. As soon as the mBMC 145 is instructed to power off from the OS 143, the mBMC 145 transmits a power-off signal to the power controller 147 to disconnect the power from the power supply 148 of the blade server 140. When the IPMI command sent from the power control program is not "Soft Shutdown" at the conditional branch 805, the mBMC 145 transmits a signal in accordance with the contents of the request made thereto to the power controller 147, thus forcing the same to execute the request. Then, the mBMC 145 on the blade server 140 transmits the result of the conducted power control to the power control program 123 on the management server 120 (815), and terminates its operation (816). The power control program 123 on the management server 120, in turn, receives the result of the power control from the mBMC 145 (817), and terminates the power control process (818).

The user authentication function of the BMC simply stores a combination of a user ID with a password, which is compared for user authentication, and is therefore limited in hardware. In addition, if a power control request is authenticated only by the BMC of the blade server, thee BMC cannot prevent an unauthorized access which directly requests the BMC for the power control. According to this embodiment, on the contrary, power control requests from clients are collectively received by the reliable management server, and the management server authenticates the power control requests before remote power control is conducted for the blade servers, thus making it possible to sufficiently authenticate the power control requests.

Also, for increasing the security level, the authentication of the management server 120 may be performed by an authentication function of the mBMC 145 of the blade server 140. When the management server 120 transmits a power control command to the blade server, the management server 120 transmits identification information indicative of the management server 120 together with the power control command. The mBMC 145 accepts the power control command only from a predetermined management server. The identification information of the management server 120 may be the IP address or MAC address of the management server 120.

While the foregoing embodiment assumes that the management server is located in the same site as the blade servers, the security is increased by authenticating the management server even when the management server is located in a site remote from the blade servers. Also, when there are a plurality of management servers, a flexible power management can be carried out as well by authenticating the respective management servers.

Since the BMC of the blade server provides a simple authentication function, the double authentication as described above enables the management server to strictly authenticate a user who uses a client, and the BMC of the blade server to simply authenticate the management server.

While the foregoing embodiment has been described on the assumption that the simple authentication of the BMC is utilized, if even a management controller such as the BMC is capable of strict authentication, this authentication can be used.

Also, from the limitations of the BMC mentioned above, a server allocation management policy may be introduced to determine whether or not the allocation and power control are permitted by grouping users who conduct the power control and servers to be allocated, or by providing them with a plurality of attributes, so that the system can be managed with a high degree of freedom.

Before the management server remotely controls the power of a blade server, the management server can determine whether or not the power control should be permitted not only from simple authentication of a user but also from registered user information, belonging group, power state of the blade server, and presence/absence of failure in the blade server, so that the system administrator can establish a server allocation policy with a higher degree of freedom.

The foregoing embodiments can be modified or combined as appropriate without departing from the spirit and scope of the present invention.

The invention claimed is:

1. A blade server power control method in a system having a server composed of a plurality of blade servers, a client for operating the blade server, and a management server for managing the server, wherein said management server has information indicative of a correspondence relationship between a blade server user identifier for identifying a user who uses said blade server, and said blade server, wherein said client transmits a first power control request to said management server, said first power control request including a client user identifier for identifying a user who uses said client, and information for identifying said blade server, wherein said management server, upon receipt of the first power control request, determines from the information indicative of the correspondence relationship whether the blade server user identifier corresponding to the client user identifier corresponds to the information for identifying said blade server, wherein said management server transmits a second power control request to said blade server which is identified based on the information for identifying said blade server when said blade server user identifier corresponds to the information for identifying said blade server, wherein said blade server, upon receipt of the second power control request, controls its power based on the received second power control request, wherein said management server stores management information indicating whether any failure is detected or not in each of said blade servers, said management information being associated with the information for identifying said blade server, and wherein said management server does not transmit the second power control request to the identified blade server, when said management information indicates that a failure is detected in the identified blade server.

2. A power control method according to claim 1, wherein said blade server comprises:

a management controller, wherein said management controller receives the second power control request, and wherein said management controller controls a power controller of said blade server to control the power of said blade server.

3. A power control method according to claim 1, wherein said management server has authority information related to an authority of a user corresponded to the client user identifier, wherein said management server determines based on the authority information whether or not a user having the client user identifier included in the first power control request has the authority, and wherein said management server transmits the second power control request to a blade server identified based on the information for identifying said blade server when the user having the client user identifier has the authority.

4. A power control method according to claim 1, wherein said blade servers of said server are classified into a plurality of groups, said management server has information indicative of a correspondence relationship between each said blade server and a group to which said blade server belongs, said group corresponding to the client user identifier of the user who is permitted to control the power of a blade server which belongs to the group, and when said blade server identified based on the information for identifying said blade server belongs to a group corresponded to the client user identifier included in the first power control request, said management server transmits the second power control request to said identified blade server.

5. A power control method according to claim 1, wherein when the first power control request is a request for powering off or re-starting said blade server and when a power state of said blade server acquired through said management controller of said blade server is on, said management server transmits the second power control request to said identified blade server.

6. A power control method according to claim 1, wherein the information for identifying said blade server includes at least one of a Media Access Control (MAC) address and an Internet Protocol (IP) address of said blade server.

7. A power control method according to claim 2, wherein said second power control request includes information for identifying said management server, and
wherein said management controller, upon receipt of the second power control request, determines based on the information for identifying said management server included in the second power control request whether or not a power control request should be executed for said blade server having said management controller.

8. A power control method according to claim 1, wherein said management server is part of a plurality of said blade servers which make up said server.

9. A system having a server composed of a plurality of blade servers, a client for operating the blade server, and a management server for managing the server,
wherein said client comprises:
a remote operation unit for transmitting operation information entered through an input device to said blade server;
a display unit for displaying screen information received from said blade server; and
a power control request generation unit for creating a first power control request including a client user identifier for identifying a user who uses said client, and information for identifying said blade server, and transmitting the first power control request,
wherein said management server comprises:
a storage device for storing information indicative of a correspondence relationship between a blade server user identifier for identifying a user who uses said blade server, and said blade server;
a request reception unit for receiving the first power control request;
a determination processing unit for determining from the information indicative of the correspondence relationship whether the blade server user identifier corresponding to the client user identifier included in the first power control request corresponds to the information for identifying said blade server; and
a power control command generation unit for transmitting a second power control request to said blade server identified based on the information for identifying said blade server when the blade server user identifier corresponds to the information for identifying said blade server, and
wherein said blade server comprises:
a remote operation service unit for receiving operation information transmitted from said client, operating said blade server, and transmitting the screen information to said client;
a management controller for controlling a power controller of said blade server; and
a power controller for controlling a power supply of said blade server based on the second power control request,
wherein said storage device of said management server further stores management information indicating whether any failure is detected or not in each of said blade servers, said management information being associated with the information for identifying the blade server, and
wherein said power control command generation unit of said management server does not transmit the second power control request to the identified blade server, when said management information indicates that a failure is detected in the identified blade server.

10. A system according to claim 9, wherein said management server has authority information related to an authority of a user corresponded to a user identifier, said determination processing unit determines based on the authority information whether or not a user having the client user identifier included in the first power control request has the authority, and said power control command generation unit transmits the second power control request to the blade server identified based on the information for identifying said blade server when the user having the client user identifier has an execution authority.

11. A system according to claim 9, wherein said blade servers of said server are classified into a plurality of groups, said management server has information indicative of a correspondence relationship between each said blade server and a group to which said blade server belongs, said group corresponding to the client user identifier of the user who is permitted to control the power of a blade server which belongs to the group, and when said blade server identified based on the information for identifying said blade server belongs to a group corresponded to the client user identifier included in the first power control request, said management server transmits the second power control request to said identified blade server.

12. A system according to claim 9, wherein said information for identifying a blade server includes at least one of a MAC address and an IP address of said blade server.

13. A system according to claim 9, wherein said management controller of said blade server determines based on the information for identifying said management server included in the second power control request whether or not a power control request should be executed for said blade server having said management controller.

14. A system according to claim 9, wherein said management server is part of a plurality of said blade servers which make up said server.

15. A management server for managing a blade server comprising:
a storage device for storing information indicative of a correspondence relationship between a user who uses a client and said blade server;
a request reception unit for receiving a first power control request including a client user identifier for identifying a user who uses the client, and information for identifying said blade server;
a determination processing unit for determining from the information indicative of the correspondence relationship whether a blade server user identifier corresponding to the client user identifier included in the first power control request corresponds to the information for identifying said blade server; and
a power control command generation unit for transmitting a second power control request to said blade server identified based on the information for identifying said blade server when the blade server user identifier corresponds to the information for identifying said blade server,
wherein said storage device of said management server further stores management information indicating whether any failure is detected or not in each of said blade servers, said management information being associated with the information for identifying said blade server, and
wherein said power control command generation unit of said management server does not transmit the second power control request to the identified blade server, when said management information indicates that a failure is detected in the identified blade server.

* * * * *